(12) United States Patent
Li et al.

(10) Patent No.: US 11,411,281 B2
(45) Date of Patent: Aug. 9, 2022

(54) MULTI-LAYERED COMPOSITE FUNCTIONAL SEPARATOR FOR LITHIUM-ION BATTERY

(71) Applicant: Shanghai Dinho New Material Technology Co., Ltd., Shanghai (CN)

(72) Inventors: Jianhua Li, Shanghai (CN); Suzhen Cheng, Shanghai (CN); Zhengqiang Wang, Shanghai (CN); Meihua Yu, Shanghai (CN); Qingling Zhi, Shanghai (CN); Xin Zhang, Shanghai (CN); Shaojun Yan, Shanghai (CN)

(73) Assignee: Shanghai Dinho New Material Technology Co., Ltd., Shanghai (CN)

( * ) Notice: Subject to any disclaimer, the term of this patent is extended or adjusted under 35 U.S.C. 154(b) by 259 days.

(21) Appl. No.: 16/349,947

(22) PCT Filed: Nov. 14, 2016

(86) PCT No.: PCT/CN2016/105633
§ 371 (c)(1),
(2) Date: May 14, 2019

(87) PCT Pub. No.: WO2018/086095
PCT Pub. Date: May 17, 2018

(65) Prior Publication Data
US 2019/0334149 A1 Oct. 31, 2019

(51) Int. Cl.
*H01M 50/446* (2021.01)
*H01M 50/449* (2021.01)
(Continued)

(52) U.S. Cl.
CPC ..... *H01M 50/446* (2021.01); *H01M 10/0525* (2013.01); *H01M 50/403* (2021.01)

(58) Field of Classification Search
CPC ............. H01M 50/446; H01M 50/449; H01M 50/451; H01M 50/457; H01M 50/403
See application file for complete search history.

(56) References Cited

U.S. PATENT DOCUMENTS

| 6,096,456 A | * | 8/2000 | Takeuchi | H01G 9/02 429/249 |
| 2001/0005560 A1 | * | 6/2001 | Yoshida | H01M 50/449 429/144 |

(Continued)

FOREIGN PATENT DOCUMENTS

| CN | 101218695 A | 7/2008 |
| CN | 102668173 A | 9/2012 |

(Continued)

OTHER PUBLICATIONS

International Search Report issued in connection with International Patent Application No. PCT/CN2016/105633 dated Jul. 28, 2017.

*Primary Examiner* — James Lee
(74) *Attorney, Agent, or Firm* — Knobbe, Martens, Olson & Bear, LLP (57) ABSTRACT

A multi-layer composite functional separator for lithium ion battery includes four layers. Layer A is a base separator. Layer B is a porous structural layer composed of insulating inorganic compounds or high temperature resistant polymers. Layer C is a porous layer composed of polymer microspheres with temperature-induced expansion characteristics. Layer D is a thermoplastic resin with a melting point of 80-110° C. and a crystallinity of <50%. Layer B, Layer C and Layer D are sequentially attached on either or both sides of Layer A. Compared with the existing lithium-ion battery separator, the multi-Layer Composite functional separator has excellent heat resistance. The thermal shrinkage rate is less than 1% when heated for less than one hour at 200° C. Inclusion of organic polymer microspheres produces thermal closure of the batteries, which improves the safety of the batteries.

14 Claims, 3 Drawing Sheets

(51) Int. Cl.
    *H01M 50/451*     (2021.01)
    *H01M 50/457*     (2021.01)
    *H01M 50/403*     (2021.01)
    *H01M 10/0525*     (2010.01)

(56) References Cited

U.S. PATENT DOCUMENTS

| | | | |
|---|---|---|---|
| 2005/0221165 A1* | 10/2005 | Hennige | D06M 23/08 |
| | | | 429/62 |
| 2007/0099072 A1* | 5/2007 | Hennige | H01M 50/411 |
| | | | 429/144 |
| 2007/0122716 A1* | 5/2007 | Seo | H01M 50/449 |
| | | | 429/251 |
| 2013/0330592 A1* | 12/2013 | Mizuno | H01M 50/403 |
| | | | 429/145 |
| 2014/0272489 A1* | 9/2014 | Anandan | H01M 50/581 |
| | | | 429/61 |
| 2014/0349168 A1* | 11/2014 | Yashiki | H01M 50/449 |
| | | | 429/144 |

FOREIGN PATENT DOCUMENTS

| | | |
|---|---|---|
| CN | 103915594 A | 7/2014 |
| CN | 104347835 A | 2/2015 |
| CN | 105140450 A | 12/2015 |
| CN | 105845871 A | 8/2016 |

\* cited by examiner

MULTI-LAYERED COMPOSITE FUNCTIONAL SEPARATOR FOR LITHIUM-ION BATTERY

TECHNICAL FIELD

The invention belongs to the technical field of lithium ion batteries, particularly the technical field of lithium ion battery separators, to be specific, a multi-layer composite functional separator and its preparation method are proposed.

BACKGROUND TECHNIQUE

Since the commercialization by Sony Corporation in 1990, lithium-ion batteries have achieved rapid development. With the increasing awareness of global environmental protection, the development and utilization of new energy technologies has become the consensus of all countries in the world. Lithium-ion batteries as a new energy storage products with environmental protection characteristics and superior performance, are used in a wide range of applications. Applications in the fields of energy storage, electric vehicles, aerospace and other fields have placed more stringent requirements on lithium-ion batteries. The safety issue, which has drawn widespread public concern since the beginning of commercialization, is still the focus problem that lithium battery manufacturers and research institutions have paid much attention to and tried to solve.

Although lithium-ion battery separators do not participate in chemical reactions in lithium-ion batteries, they are key materials that affect the safety of lithium-ion batteries. In general, requirements of lithium-ion batteries separators should be:

1) The separators shall be electronically insulating to ensure mechanical isolation of the positive and negative electrodes;
2) The separators shall have a certain pore size and porosity, ensuring low electrical resistance and high ionic conductivity, moreover, good permeability to lithium ions;
3) Due to that the solvent of the electrolyte is a highly polar organic compound, the separator must be resistant to electrolyte corrosion, with sufficient chemical and electrochemical stability;
4) Good wettability to electrolyte and sufficient moisture absorption and retention capacity;
5) Sufficient mechanical properties, including excellent puncture strength, tensile strength, etc., but the thickness shall be as small as possible;
6) Remarkable space stability and flatness;
7) Thermal stability and automatic shutdown protection performance and;
8) The heat shrinkage shall be small, which is especially important for lithium ion power batteries, because if the heat shrinkage is too large, it will cause a short circuit, which will further lead to a thermally induced failure.

At present, polyolefin-based porous separators are commonly used in commercial lithium ion batteries, and can be classified into dry and wet process due to different preparation processes. The difference between these two types is mainly due to the different mechanism of micropore formation in the separator. However, the outstanding problem of the two battery separators is that during the abnormal charging and discharging of the lithium ion battery, the separator shrinks or deforms due to the temperature rise. Direct contact of battery electrodes causes short circuit and battery explosion in extreme cases. In addition, it also has some problems such as poor liquid absorption ability and poor wettability.

Therefore, in order to meet the above safety requirements of the lithium ion battery, it is necessary to propose a more heat resistant multi-layer composite functional separator.

SUMMARY OF THE INVENTION

The object of the invention is to provide a multi-layer composite functional separator with good heat resistance and a preparation method thereof. The multilayer composite functional separator has the advantages of simple preparation method, low cost and high heat resistance, and can meet the safety requirements of lithium ion batteries, especially lithium ion power batteries.

The multi-layer composite functional separator comprises Layer A, Layer B, Layer C and Layer D, among which Layer A is the base layer and Layer B is a porous structure layer composed of insulating inorganic compounds or high temperature resistant polymers; Layer C is a porous layer composed of polymer microspheres with temperature-induced expansion characteristics; Layer D is a porous layer composed of thermoplastic resins. Layer B, Layer C and Layer D are attached to one or both sides of Layer A successively.

Among them, the Layer A is a porous membrane formed from one or more of the following materials: polyethylene (PE), polypropylene (PP), polyester (PET), polyimide (PI), poly-p-phenylene terephthamide (PPTA), polyisobutylene (PIB).

In Layer B, the insulating inorganic compound can be selected from various inorganic compounds with insulating properties; one or more mixtures of alumina, zirconia, silica, zirconium silicate and barium sulfate are preferred; the mixture of alumina or alumina and barium sulfate is more preferred; a 1:1 volume ratio of the mixture of alumina and barium sulfate is far more preferred. The high temperature resistant polymerization as stated refers to a polymer with a melting temperature of more than 180° C. One type or a mixture of polyester (PET), polyimide (PI), polysulfone (PSF), polyphenylene sulfide (PPS), polybenzimidazole (PBI) and poly (p-hydroxybenzoate) (POB) is preferred. For example, when using a mixture, the above-mentioned high temperature resistant polymers can be used in various proportions as required.

In Layer C, the temperature-induced expansion characteristic refers to the rapid expansion characteristic of the polymer at a certain temperature. The invention requires that the initial temperature of the expansion excitation of the polymer is less than 120° C. and the volume expansion rate is more than 100%. The average particle size of the polymer is 2-10 um, and the acrylic polymer is preferred, such as the small sphere with thermal expansion formed by a method developed by Sekisui Chemical Group, through packing low-boiling-point hydrocarbons into thermoplastic polymer package.

The Layer D is located in the outer layer of the multi-layer composite functional separator. The thermoplastic resin shall be selected from those who has a melting point of 80-110° C. and a crystallinity of less than 50%. The porous layer composed of one or more mixtures of polyvinylidene fluoride (PVDF), polyvinylidene fluoride-hexafluoropropylene (PVDF-HFP), polyacrylic acid resin (PAA) polymethyl methacrylate (PMMA) that is preferred. Vinylidene fluoride (PVDF) is more preferred.

If not explicitly specified, the above-mentioned layers of polymeric organic matter are selected within the range of degree of polymerization commonly used in the field of organic polymer materials.

The above layers (Layer B, Layer C and Layer D) are attached to Layer A by common methods in the field, such as coating, thermal recombination or impregnation.

In addition, the thickness of the multi-layer composite functional separator stated in this invention can be the thickness of the commonly used separators in the field. The thickness of Layer A is related to the preparation method, and the thickness of Layer B, Layer C and Layer D is related to the adhesion method.

Generally speaking, the total thickness of the multi-layer composite functional separator is 12-50 um, in which the thickness of Layer A is 6-30 um, the thickness of Layer B is 1-8 um, the thickness of Layer C is 1-10 um, and the thickness of Layer D is 1-6 um.

Each of the above layers adopts a porous structure, and the porosity thereof is also closely related to the preparation method.

Generally speaking, the average porosity of the multi-layer composite functional separator is more than 40%, of which the porosity of Layer A is 40-70%, the porosity of Layer B is 40-60%, the porosity of Layer C is 30-40%, and the porosity of Layer D is 30-35%.

Furthermore, on the basis of a large number of experiments, the present invention puts forward a multi-layer composite functional separator with good heat resistance of the following structures.

A multi-layer composite functional separator consists of Layer A, Layer B, Layer C and Layer D, in which Layer A is the base layer and Layer B is a porous structure layer composed of insulating inorganic compounds or high temperature resistant polymers; Layer C is a porous layer composed of polymer microspheres with temperature-induced expansion characteristics; Layer D is a porous layer composed of thermoplastic resins; Layer B, Layer C and Layer D are attached to both sides of Layer A successively. (DCBABCD).

A multi-layer composite functional separator consists of Layer A, Layer B, Layer C and Layer D, in which Layer A is the base layer and Layer B is a porous structure layer composed of insulating inorganic compounds or high temperature resistant polymers; Layer C is a porous layer composed of polymer microspheres with temperature-induced expansion characteristics; Layer D is a porous layer composed of thermoplastic resins; Layer B adheres to one side of Layer A and forms an AB composite layer. Then Layer C and Layer D are attached to both sides of AB composite layer (DCABCD).

A multi-layer composite functional separator consists of Layer A, Layer B, Layer C and Layer D, in which Layer A is the base layer and Layer B is a porous structure layer composed of insulating inorganic compounds or high temperature resistant polymers; Layer C is a porous layer composed of polymer microspheres with temperature-induced expansion characteristics; Layer D is a porous layer composed of thermoplastic resins; Layer B is attached to both sides of Layer A to form a BAB composite layer, then Layer C is attached to one side of the BAB composite layer to form a CBAB composite layer or a BABC composite layer, and finally Layer D is attached to both sides of the CBAB composite layer or the BABC composite layer (DCBABD or DBABCD).

A multi-layer composite functional separator consists of Layer A, Layer B, Layer C and Layer D, in which Layer A is the base layer and Layer B is a porous structure layer composed of insulating inorganic compounds or high temperature resistant polymers; Layer C is a porous layer composed of polymer microspheres with temperature-induced expansion characteristics; Layer D is a porous layer composed of thermoplastic resins; The Layer B, Layer C and Layer D are attached to one side of Layer A successively (DCBA or CBAD or DABC or CABD).

A multi-layer composite functional separator consists of Layer A, Layer B, Layer C and Layer D, in which Layer A is the base layer and Layer B is a porous structure layer composed of insulating inorganic compounds or high temperature resistant polymers; Layer C is a porous layer composed of polymer microspheres with temperature-induced expansion characteristics; Layer D is a porous layer composed of thermoplastic resins; Layer B is attached to both sides of the Layer A to form a BAB composite layer, and then Layer C and Layer D are attached to one side of the BAB composite layer successively (CBABD or BABCD).

In addition, the thickness of the multi-layer composite functional separator stated in this invention can be the thickness of the commonly used separators in the field. The thickness of Layer A is related to the preparation method, and the thickness of Layer B, Layer C and Layer D is related to the adhesion method.

Generally speaking, the total thickness of the multi-layer composite functional separator is 12-50 um, in which the thickness of Layer A is 6-30 um, the thickness of Layer B is 1-8 um, the thickness of Layer C is 1-10 um, and the thickness of Layer D is 1-6 um.

Each of the above layers adopts a porous structure, and the porosity thereof is also closely related to the preparation method.

Generally speaking, the average porosity of the multi-layer composite functional separator is more than 40%, of which the porosity of Layer A is 40-70%, the porosity of Layer B is 40-60%, the porosity of Layer C is 30-40%, and the porosity of Layer D is 30-35%.

Furthermore, the invention also provides a preparation method of the multilayer composite functional separator.

The preparation method of the multi-layer composite functional separator comprises the following steps:

1) Take the Layer A separator;
2) Prepare the slurry for Layer B: one or more kinds of insulating inorganic compounds or high temperature resistant polymers are evenly dispersed in aqueous solution, and organic acid polymer solution is added to make the mixture uniform and disperse at high speed; by adding thickener, the viscosity of solution is adjusted to 100-500 cP, solid content is adjusted to 30-60%. As a result, the slurry used for Layer B coating is obtained.
3) Prepare the slurry for Layer C: Disperse one or more kinds of polymer microspheres in aqueous solution, add organic acid macromolecule solution, to make the mixture uniform and disperse at high speed; adjust the solution viscosity by adding thickener, to make the solution viscosity 100-500 cP, and solid content 3-15%. As a result, the slurry used for Layer C coating is obtained.
4) Prepare the slurry for Layer D: Disperse one or more thermoplastic resin powder with melting point at 80-110° C. and crystallinity less than 50% in aqueous solution, add organic acid polymer solution to make it mix evenly and disperse at high speed. Adjust the solution viscosity by adding water-soluble polymer organic acid binder and thickener to make the solution viscosity 200-800 cP, and solid content 15-40%. As a result, the slurry used for Layer D coating is obtained.

5) One or more coating, impregnation, printing or thermal composite processes are used to attach Layer B, Layer C and Layer D slurries to Layer A successively. Each layer needs to be baked after attachment with temperature range of 40° C.-80° C.

In step 1, the Layer A separator can be directly purchased from a commercial base separator store with a porosity of 40%-70% and no special treatment is required on the surface.

In step 2, the dispersion can be carried out by a high-speed dispersion device or a high-speed grinding device.

In step 2-4, the organic acid polymer solution is one or two groups with carboxylic acid group and sulfonic acid group, and the solid content range of the organic acid polymer solution is 20-50 wt %.

The thickener adopts one or two mixtures of cellulose and polyacrylic acid polymer.

The water-soluble macromolecule organic acid binder can adopt various water-soluble macromolecule organic acid binders commonly used in this field, especially water-soluble macromolecule organic acid binders whose viscosity-average molecular weight is more than 20000.

The existing lithium ion battery separator is made of PP/PE/PP three-layer composite separator by extrusion-stretching method. The closed-cell function of the separator is realized through the low melting temperature of PE. The temperature of PE can not be adjusted. In the present invention, we adopt thermal expansion polymer microspheres, whose volume expand with the increase of temperature, thus the current density of the battery can be automatically adjusted, and the current distribution at the high temperature of the battery can be reduced. When the temperature is out of control, the expanded microspheres will completely close the separator pore, and the expansion of the separator will increase the distance between the positive and negative plates, which can more effectively ensure the safety of the battery.

Compared with the existing separators for lithium-ion batteries, the multi-layer composite functional separator is suitable for lithium-ion batteries, especially power lithium-ion batteries, and has excellent heat resistance. The thermal shrinkage rate of the multi-layer composite functional separator is less than 1% when heated at 200° C. for 1 h, and the safety of the batteries is improved due to the introduction of organic polymer microspheres.

DETAILED DESCRIPTION OF THE PREFERRED EMBODIMENT

The present invention is further elaborated by means of specific embodiments and in conjunction with the accompanying drawings, and its performance testing methods are as follows:

1. Thermal Stability

According to the mechanical direction MD (Machine Direction) of the separators, and TD (Transverse Direction) cut rectangular separators by the size of 15 cm*10 cm. The rectangular side is parallel to the MD direction of the separator, and the narrow side is parallel to the TD direction of the separator. Place the separators in the oven with the temperature set at 200° C. for 1 hour. Then take out and measure the length (L) and width (W) of the separators.

MD direction heat shrinkage=$L/15 \times 100\%$;

TD direction heat shrinkage=$W/10 \times 100\%$.

2. Porosity Test

Measure the porosity of separator by using USA Conta PoreMaster automatic mercury porosimeter.

3. Bonding Test

The peeling strength of coated separators is measured by a computer controlled electronic universal material testing machine, and the bonding performance was measured by the peeling strength. Cut the rectangular separator with the size of 1 cm*15 cm by the cutting machine. The multi-layer separators are stacked together with an aluminium foil collector in the middle. The laminated separators are placed in the middle of two pieces of plexiglass, together placed in an oven at 130° C. for 30 minutes and pressed with 10N heavy material. The bonding property of coated separators are tested by using a computer controlled universal material testing machine in peeling test mode.

4. Electrochemical Performance Test

The preparation method of lithium ion batteries: use lithium nickel cobalt manganese oxide as positive active material, graphite as negative active material, use LPF6 whose electrolyte salt is 1 mol/L, electrolyte solvent of DMC:EC:EMC=1:1:1, and composite coating separators, to assembly lithium ion batteries with named Model 200 mm*170 mm*10 mm.

The test conditions and categories are as follows:

| Test method | Charge and Discharge Test | Overcharge | Acupuncture | 150° C. Hot Box Test |
|---|---|---|---|---|
| Test conditions | 1C A charging | 3C A charging | diameter 2-5 mm | insulation for 30 min |

Embodiment 1

The multi-layer composite functional separator stated in the present invention is prepared according to the following steps:

1) The porous separator formed by using polyethylene terephthalate (PET) material is Layer A, the porosity of which is 60%, and the thickness is 20 um;

2) Configure Layer B slurry: alumina powder with average particle size D50 of 0.8 um is evenly dispersed in pure water, high-speed disperser is used to add organic acid macromolecule solution to make it mix evenly and disperse at high speed, and thickener is added to adjust the viscosity of solution to make its viscosity 120 cps and solid content 45%, thus, slurry used for Layer B coating is obtained.

Figure 1:
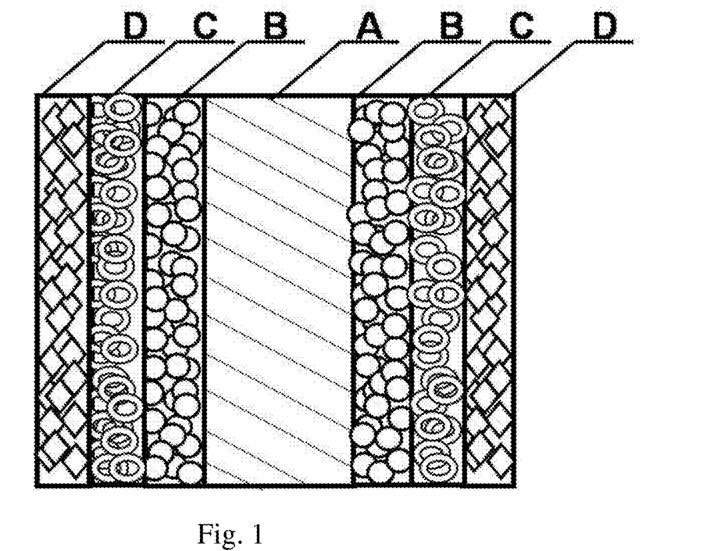
FIGS. 1, 2 and 3 are the distribution patterns of functional layers in embodiments 1, 2 and 3.

3) Configure Layer C slurry: Disperse macromolecule polymer microspheres (acrylic polymer microspheres, Sekisui Chemical) in aqueous solution, add organic acid macromolecule solution, make the mixture uniform and disperse at high speed; adjust the viscosity of solution by adding thickener, make the viscosity of solution 100 cps, solid content 3%, thus, slurry used for Layer C coating is obtained;

4) Configure of Layer D slurry: Disperse Polyvinylidene fluoride (PVDF) in aqueous solution, add organic acid macromolecule solution to make the mixture uniform and disperse at high speed; by adding adhesives and thickeners to adjust the viscosity of the solution, the viscosity of the solution is 300 cps, the solid content is 25%, thus, the slurry used for Layer D coating is obtained;

5) In the process of gravure coating, Layer B, Layer C and Layer D slurries are attached to Layer A successively, and the specific distribution mode is DCBABCD; the drying temperature of Layer B is 70° C., Layer C is 55° C., and Layer D is 70° C.

The total thickness of composite multilayer functional separator is 50 um, the thickness of Layer A is 28 um, the thickness of Layer B is 4+4 um, the thickness of Layer C is 3+3 um, and the thickness of Layer D is 4+4 um.

Embodiment 2

The multi-layer composite functional separator stated in the present invention is prepared according to the following steps:

1) The porous separator made of poly (terephthaloyl terephthalamide) (PPTA) is chosen as Layer A.

2) 3) 4), the three steps are the same as 2) 3) 4 in Embodiment 1.

Figure 2:
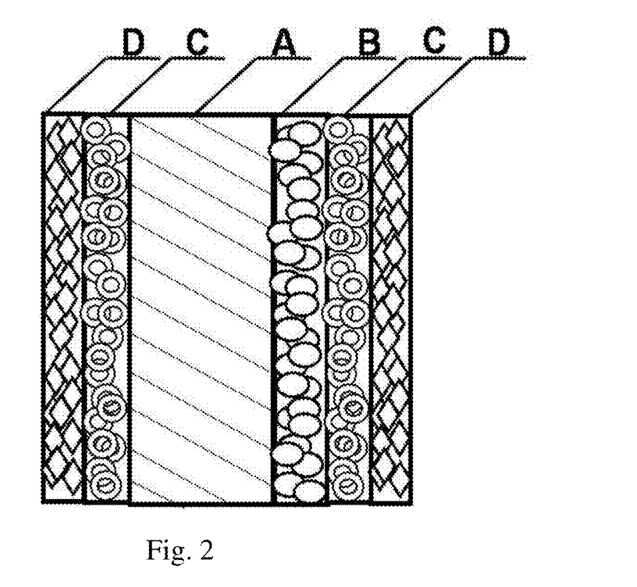

5) The process of immersion coating is used to attach Layer B slurry, Layer C slurry and Layer D slurry to Layer A successively. The specific distribution mode is DCABCD; the drying temperature of Layer B is 75° C., Layer C is 60° C., and Layer D is 70° C.

The total thickness of the composite multilayer functional separator is 40 um, the thickness of Layer A is 22 um, the thickness of Layer B is 5 um, the thickness of Layer C is 3.5+3.5 um, and the thickness of Layer D is 3+3 um.

Embodiment 3

The multi-layer composite functional separator stated in the present invention is prepared according to the following steps:

1) 2) 3), the steps are the same as 1) 2) 3 in Embodiment 1.

4) The polyvinylidene fluoride (PVDF) in embodiment 1 is replaced by polyvinylidene fluoride-hexafluoropropylene (PVDF-HFP), and the slurry configuration is the same as step 4 in embodiment 1.

Figure 3:
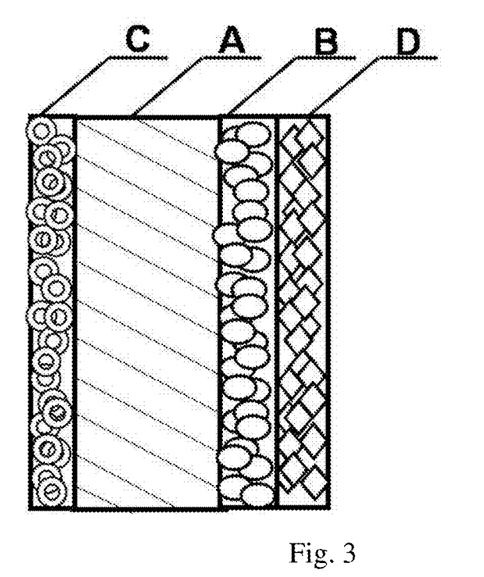

5) The process of immersion coating is adopted, to attach the slurry of Layer B, Layer C and Layer D to Layer A successively. The specific distribution mode is CABD; the drying temperature of Layer B is 65° C., Layer C is 55° C., and Layer D is 60° C.

The total thickness of the composite multilayer functional separator is 27 um, the thickness of Layer A is 20 um, the thickness of Layer B is 2.5 um, the thickness of Layer C is 2 um, and the thickness of Layer D is 2.5 um.

Embodiment 4

The multi-layer composite functional separator stated in the present invention is prepared according to the following steps:

1) The polyethylene terephthalate (PET) separator is replaced by polypropylene (PP) as Layer A with a thickness of 20 um.

2) Alumina powder is changed into zirconia powder with average particle size D50 of 0.73 um, which is evenly dispersed in pure water and mixed with organic acid macromolecule solution to make the mixture uniform and disperse at high speed, and the viscosity of solution was adjusted by adding thickener to make the viscosity of solution 500 cps.

3) Same as step 3 in Embodiment 1.

4) The polyvinylidene fluoride (PVDF) in embodiment 1 is replaced by polyacrylic acid resin (PAA), and the slurry configuration is the same as step 4 in embodiment 1.

Figure 4:
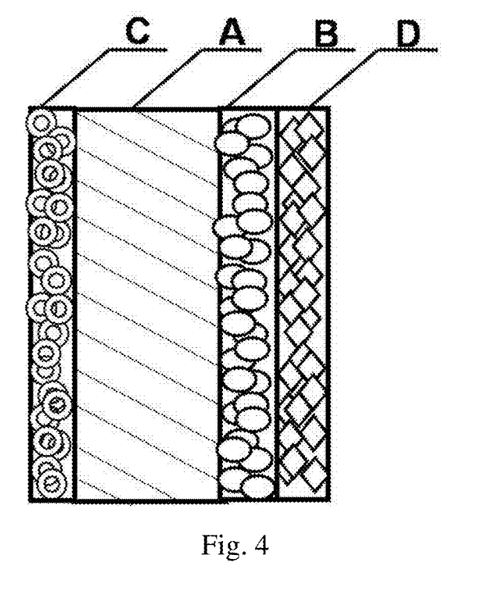
FIGS. 4, 5 and 6 are the distribution patterns of functional layers in embodiments 4, 5, and 6, respectively.

5) Use immersion coating process, attach Layer B, Layer C and Layer D slurries to Layer A successively. The specific distribution mode is DCAB; the drying temperature of Layer B is 70° C., Layer C is 55° C., and Layer D is 60° C.

The total thickness of the composite multilayer functional separator is 12 um, the thickness of Layer A is 7 um, the thickness of Layer B is 3 um, the thickness of Layer C is 1 um, and the thickness of Layer D is 1 um.

Embodiment 5

The multi-layer composite functional separator stated in the present invention is prepared according to the following steps:

1) The polyethylene terephthalate (PET) separator is replaced by polyisobutylene (PIB) as Layer A with a thickness of 20 um.

2) Add polyimide (PI) into organic acid polymer solution to make the mixture uniform and disperse at high speed, adjust the solution viscosity by adding thickener to make the viscosity 400 cps.

3) Same as step 3 in Embodiment 1.

4) The polyvinylidene fluoride (PVDF) in Embodiment 1 is replaced by polymethyl methacrylate (PMMA), and the slurry configuration is the same as step 4 in Embodiment 1.

Figure 5:
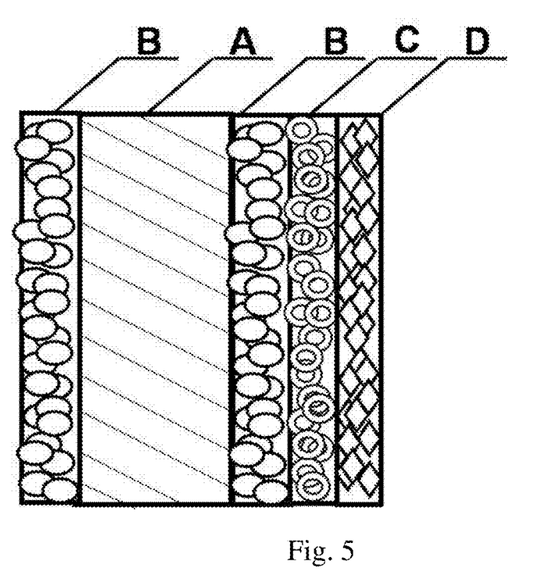

5) In gravure coating process, layer B, layer C and layer D slurries are attached to layer A successively, and the specific distribution mode is BABCD; the drying temperature of Layer B is 50° C., Layer C is 55° C., and Layer D is 80° C.

The total thickness of the composite multilayer functional separator is 31 um, the thickness of Layer A is 20 um, the thickness of Layer B is 3+3 um, the thickness of Layer C is 2 um, and the thickness of Layer D is 3 um.

Embodiment 6

The multi-layer composite functional separator stated in the present invention is prepared according to the following steps:

1) The porous separator formed by polyimide (PI) materials is chosen as Layer A.

2) Alumina powder (average particle size D50 is 0.5 um) and barium sulfate powder (average particle size D50 is 0.38 um) with volume ratio of 1:1 are evenly dispersed in pure water, and organic acid polymer solution is added to make the mixture uniform and disperse at high speed, and the viscosity of solution is 400 cps by adding thickener to adjust the viscosity of solution.

3) 4), the steps are the same as 3) 4) in Embodiment 1.

Figure 6:
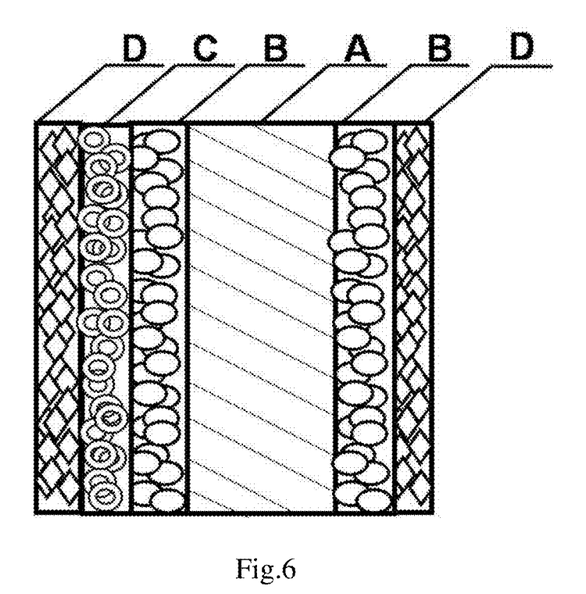

5) The process of immersion coating is adopted, and the slurries of Layer B, C and D are attached to Layer A successively. The specific distribution mode is DCBABD; the drying temperature of Layer B is 75° C., Layer C 60° C. and Layer D 70° C.

The total thickness of the composite multilayer functional separator is 29 um, the thickness of Layer A is 17 um, the thickness of Layer B is 2.5+2.5 um, the thickness of Layer C is 3 um, and the thickness of Layer D is 2+2 um.

Comparative Example 1

The multi-layer composite functional separator stated in the present invention is prepared according to the following steps:
1) The porous separator formed by using polyethylene terephthalate (PET) material selected as Layer A, with porosity of 65%, and thickness of 20 um;
2) 3), these two steps are the same as 2) 3) in Embodiment 1;
4) Adopting the immersion coating process, Layer B slurry and Layer C slurry are sequentially attached to Layer A; drying temperature of Layer B is 75° C., and drying temperature of Layer C is 60° C.

The total thickness of the composite multilayer functional separator is 26.5 um, the thickness of layer A is 20 um, the thickness of layer B is 4.5 um, and the thickness of layer C is 2 um.

Comparative Example 2

The multi-layer composite functional separator stated in the present invention is prepared according to the following steps:
1) The porous separator formed by poly (terephthaloyl-terephthalamide) (PPTA) material is selected as Layer A, with a porosity of 65% and a thickness of 15 um.
2) 3), the two steps are the same as 2) 4) in Embodiment 1.
4) The process of immersion coating is adopted, to attach Layer B slurry and the Layer D slurry to Layer A successively; the drying temperature of the B layer is 75° C., and that of the Layer D is 60° C.

The total thickness of the composite multilayer functional separator is 25 um, the thickness of Layer A is 15 um, the thickness of Layer B is 5.5 um, and the thickness of Layer D is 4.5 um.

Comparative Example 3

The multi-layer composite functional separator stated in the present invention is prepared according to the following steps:
1) The porous separator formed by polyethylene terephthalate (PET) is selected as Layer A, with a porosity of 65% and a thickness of 17 um.
2) 3), the two steps are the same as 3) 4) in Embodiment 1.
4) The process of immersion coating is adopted, to attach Layer C slurry and Layer D slurry to Layer A successively, and the drying temperature of Layer B and Layer D is 75° C. and 60° C. respectively.

The total thickness of the composite multilayer functional separator is 25 um, the thickness of Layer A is 17 um, the thickness of Layer B is 3 um, and the thickness of Layer D is 5 um.

Comparative Example 4

The commercial PP separator is tested directly without any treatment.
(1) Thermal Stability at Different Temperatures The functional separators of composite coatings and the polypropylene microporous separator of uncoated composite coatings obtained from Embodiments 1-3 and Comparative Example 1-3, are heated for 1 hour in ovens at 120, 140, 160, 180 and 200 degrees Celsius to determine the thermal stability of the separators at different temperatures, as shown in Table 1.

TABLE 1

Thermal stability of composite separators at different temperatures

| Type of separator | Thermal Shrinkage at Different Temperatures (%) | | | | |
|---|---|---|---|---|---|
| | 120° C. | 140° C. | 160° C. | 180° C. | 200° C. |
| Embodiment 1 | 0 | 0 | 0.3 | 0.5 | 0.9 |
| Embodiment 2 | 0 | 0 | 0.2 | 0.5 | 0.8 |
| Embodiment 3 | 0 | 0 | 0.4 | 0.7 | 1.0 |
| Comparative Example 1 | 0 | 0 | 0.5 | 1.0 | 1.7 |
| Comparative Example 2 | 0 | 0 | 0.6 | 1.1 | 1.7 |
| Comparative Example 3 | 0 | 0 | 0.6 | 1.3 | 2.0 |
| Comparative Example 4 | 14.8 | Deformation | Melting | Melting | Melting |

As can be seen from Table 1, the composite coating functional separators prepared in Embodiment 1-3 and Comparative Examples 1-3 exhibits lower heat shrinkage rates at ordinary temperatures than ordinary PP separators. When the temperature continues to rise, the thermal stability of the composite coating separator is enhanced due to the strong heat resistance of Layer B slurry in the composite coating; even when the temperature reaches 180° C. or higher, the shrinkage of composite coating functional separators is still less than 1.0%, and the commercially available PP separator has completely melted.

(2) Adhesion of Different Separators

Take the functional separator of composite coatings and the polypropylene microporous separator of uncoated composite coatings obtained from Embodiment 1-3 and Comparative Example 1-3. To test the bonding property according to the peeling strength at the same peeling speed of 50 mm/min, as shown in Table 2.

TABLE 2

Bonding Properties of Different Separators

| | Example 1 | Example 2 | Example 3 | Comparative Example 1 | Comparative Example 2 | Comparative Example 3 | Comparative Example 4 |
|---|---|---|---|---|---|---|---|
| Peeling strength (N) | 1.5 | 1.3 | 1.0 | 0.3 | 0.9 | 0.7 | / |

As can be seen from Table 2, the coating adhesion of the composite coating functional separators prepared in Embodiment 1-3 and Comparative Example 1-3 exhibited excellent adhesion properties at the same peeling speed.

(3) Charge and Discharge Performance of Lithium Ion Batteries Using Different Separators Lithium-ion batteries are prepared by taking the functional separators of composite coatings and the polypropylene microporous separators of uncoated composite coatings obtained from Embodiment 1-3 and Comparative Example 1-3. Charge and discharge performances of the batteries were tested at different temperatures, as shown in Table 3.

TABLE 3

Charge and Discharge Performance of Lithium Ion Batteries with Different Separators

| Type of Separator | Charge and Discharge Result of Different Separators | |
|---|---|---|
| | 25° C. | 130° C./5 min |
| Embodiment 1 | Normal | Open circuit |
| Embodiment 2 | Normal | Open circuit |
| Embodiment 3 | Normal | Open circuit |
| Comparative Example 1 | Normal | Open circuit |
| Comparative Example 2 | Normal | Normal |
| Comparative Example 3 | Normal | Open circuit |
| Comparative Example 4 | Normal | Normal |

It can be seen from the charge and discharge conditions of the different separators in Table 3 that the composite multilayer functional separator prepared in Embodiment 1-3 and Comparative Example 1 and 3 can cut off the charge and discharge path of the battery at 130° C., and functions as a thermal closure. Through analysis, due to the presence of organic polymer microspheres in the composite coating, which melt at high temperature, so that during the charging and discharging process, the voltage sharply increases to the maximum value, resulting that the current cannot be normally charged, indicating that the separators realize a thermal closure effect to the batteries.

(4) Safety Performance of Lithium Ion Batteries Using Different Separators

Lithium-ion batteries are prepared from functional separators of composite coatings and polypropylene microporous separators of uncoated composite coatings obtained from Embodiment 1-3 and Comparative Example 1-3. Overcharging, acupuncture and electrochemical experiments in an oven at 150° C. are carried out to observe whether the experimental phenomena occurred combustion or explosion to test their safety performance respectively. The results are as shown in Table 4.

TABLE 4

Safety Performance of Lithium Ion Batteries with Different Separators

| Separator Type | Overcharge | Acupuncture | 150° C. Hot Box Test |
|---|---|---|---|
| Embodiment 1 | Does not burn or explode | Does not burn or explode | Does not burn or explode |
| Embodiment 2 | Does not burn or explode | Does not burn or explode | Does not burn or explode |
| Embodiment 3 | Does not burn or explode | Does not burn or explode | Does not burn or explode |
| Comparative example 1 | Burn, does not explode | Burn, does not explode | Burn, does not explode |
| Comparative example 2 | Burn, does not explode | Burn, does not explode | Burn, does not explode |
| Comparative example 3 | Burn, does not explode | Burn, does not explode | Burn, does not explode |
| Comparative example 4 | Burn and explode | Burn and explode | Burn and explode |

From Table 4, it can be analyzed that the lithium ion batteries prepared in Embodiment 1-3 have superior safety performance.

In summary, coated with different coatings, the multi-layer composite functional separator of the invention can exert excellent heat resistance and effectively improve the safety and reliability of the energy storage device.

The above are only examples of the implementation of the present invention. It should be pointed out that for ordinary technicians in the technical field, several improvements and variations can be made without departing from the technical principles of the present invention, and these improvements and variations should also be considered within the scope of protection of the present invention.

What is claimed is:

1. A multi-layer composite functional separator for lithium ion battery, wherein the multi-layer composite functional separator comprises a Layer A, a Layer B, a Layer C and a Layer D, among them the Layer A is a base layer and the Layer B is a porous structure layer composed of insulating inorganic compound or high temperature resistant polymer; the Layer C is a porous layer composed of polymer microspheres with temperature-induced expansion characteristics; the Layer D is a porous layer composed of thermoplastic resin; the Layer B, the Layer C and the Layer D are sequentially attached to either or both sides of the Layer A, wherein, in the Layer C, an initial temperature of expansion excitation of the polymer microspheres is less than 120° C., and a volume expansion rate is more than 100%, and an average particle size of the polymer microspheres is 2-5 μm.

2. The multi-layer composite functional separator of claim 1, wherein the Layer A is a porous separator formed of a material selected from group consisting of polyethylene, polypropylene, polyester, polyimide, poly-p-phenylene terephthamide, and polyisobutylene.

3. The multi-layer composite functional separator of claim 1, wherein the insulating inorganic compound of all the Layer B is one or more mixtures of alumina, zirconia, silica, zirconium silicate and barium sulfate.

4. The multi-layer composite functional separator of claim 1, wherein the insulating inorganic compound is alumina or a mixture of alumina and barium sulfate.

5. The multi-layer composite functional separator of claim 4, wherein the insulating inorganic compound is a mixture of alumina and barium sulfate with a volume ratio of 1:1.

6. The multi-layer composite functional separator of claim 1, wherein the high temperature resistant polymer of all of the Layer B is a polymer whose a melting temperature is higher than 180° C.

7. The multi-layer composite functional separator of claim 1, wherein the high temperature resistant polymer is one or more mixtures of polyester, polyimide, polysulfone, polyphenylene sulfide, polybenzimidazole and poly-hydroxybenzoate.

8. The multi-layer composite functional separator of claim 1, wherein, in all of the Layer D, the thermoplastic resin has a melting point of 80-110° C. and a crystallinity of less than 50%.

9. The multi-layer composite functional separator of claim 1, wherein the thermoplastic resin is a porous layer composed of one or more mixtures of polyvinylidene fluoride, polyvinylidene fluoride-hexafluoropropylene, polyacrylic acid resin and polymethyl methacrylate.

10. The multi-layer composite functional separator of claim 1, wherein a total thickness of the multi-layer composite functional separator is 12-50 μm, in which a thickness of the Layer A is 6-30 μm a thickness of all of the Layer B is 1-8 μm, a thickness of all of the Layer C is 1-10 μm, and a thickness of all of the Layer D is 1-6 μm.

11. The multi-layer composite functional separator of claim 1, wherein an average porosity of the multi-layer composite functional separator is more than 40%, of which a porosity of the Layer A is 40-70%, a porosity of all of the Layer B is 40-60%, a porosity of all of the Layer C is 30-40%, and a porosity of all of the Layer D is 30-35%.

12. The multi-layer composite functional separator of claim 1, wherein the multi-layer composite functional separator comprises one of the following structures:
  a) the multi-layer composite functional separator comprises the Layer A, the Layer B, the Layer C and the Layer D, in which the Layer A is the base layer and all the Layer B is the porous structure layer composed of the insulating inorganic compound or the high temperature resistant polymer; all of the Layer C is the porous layer composed of the polymer microspheres with the temperature-induced expansion characteristics; all of the Layer D is the porous layer composed of the thermoplastic resin; the Layer B, the Layer C and the Layer D are attached to both sides of the Layer A successively to form a DCBABCD composite layer;
  b) the multi-layer composite functional separator comprises the Layer A, the Layer B, the Layer C and the Layer D, in which the Layer A is the base layer and all the Layer B is the porous structure layer composed of the insulating inorganic compound or the high temperature resistant polymer; all the Layer C is the porous layer composed of the polymer microspheres with the temperature-induced expansion characteristics; all of the Layer D is the porous layer composed of the thermoplastic resin; the Layer B is attached to one side of the Layer A to form a AB composite layer, and the Layer C and the Layer D are attached to both sides of the AB composite layer successively to form a DCABCD composite layer;
  c) the multi-layer composite functional separator comprises the Layer A, the Layer B, the Layer C and the Layer D, in which the Layer A is the base layer and all the Layer B is the porous structure layer composed of the insulating inorganic compound or the high temperature resistant polymer; all of the Layer C is the porous layer composed of the polymer microspheres with the temperature-induced expansion characteristics; all of the Layer D is the porous layer composed of the thermoplastic resin; the Layer B is attached to both sides of the Layer A to form a BAB composite layer, and then the Layer C is attached to one side of the BAB composite layer to form a CBAB composite layer or a BABC composite layer, and the Layer D is attached to both sides of the CBAB composite layer or the BABC composite layer to form a DCBABD composite layer or a DBABCD composite layer;
  d) the multi-layer composite functional separator comprises the Layer A, the Layer B, the Layer C and the Layer D, in which the Layer A is the base layer and all the Layer B is the porous structure layer composed of the insulating inorganic compound or the high temperature resistant polymer; all the Layer C is the porous layer composed of the polymer microspheres with the temperature-induced expansion characteristics; all the Layer D is the porous layer composed of the thermoplastic resin; the Layer B, the Layer C and the Layer D are attached to one side of the Layer A successively;
  e) the multi-layer composite functional separator comprises the Layer A, the Layer B, the Layer C and the Layer D, in which the Layer A is the base layer and all of the Layer B is the porous structure layer composed of the insulating inorganic compound or the high temperature resistant polymer; all of the Layer C is the porous layer composed of the polymer microspheres with the temperature-induced expansion characteristics; all of the Layer D is the porous layer composed of the thermoplastic resin; the Layer B is attached to both sides of the Layer A to form a BAB composite layer, and the Layer C and the Layer D are attached to the BAB composite layer successively to form a DCBAB composite layer or a BABCD composite layer.

13. The multi-layer composite functional separator of claim 1, wherein the thermoplastic resin is polyvinylidene fluoride.

14. A method of preparing a multi-layer composite functional separator of claim 1, comprising:
  1) preparing the Layer A separator;
  2) preparing a slurry for the Layer B: one or more kinds of the insulating inorganic compound or the high temperature resistant polymer are evenly dispersed in an aqueous solution, and an organic acid polymer solution is added to make a mixture uniform and disperse at a high speed; by adding a thickener, a viscosity of the slurry is adjusted to 100-500 cP, a solid content is adjusted to 30-60%, and the slurry used for the Layer B coating is obtained;
  3) preparing a slurry for the Layer C: dispersing one or more kinds of the polymer microspheres in an aqueous solution, adding an organic acid macromolecule solution, to make a mixture uniform and dispersing at a high speed; adjusting a solution viscosity by adding a thickener, to make a slurry viscosity 100-500 cP, and a solid content 3-15%, and the slurry used for the Layer C coating is obtained;

4) preparing a slurry for the Layer D: dispersing one or more thermoplastic resin powder with melting point at 80-110° C. and crystallinity less than 50% in an aqueous solution, adding an organic acid polymer slurry to make it mix evenly and dispersing at a high speed, and adjusting a solution viscosity by adding a water-soluble polymer organic acid binder and a thickener to make the solution viscosity 200-800 cP, and a solid content 15-40%, and the slurry used for the Layer D coating is obtained;

5) using one or more processes of coating, impregnation, printing or thermal composite processes, to attach the Layer B, the Layer C and the Layer D slurries to the Layer A successively, and each layer is baked after the attachment under temperature range of 40° C.-80° C.

\* \* \* \* \*